(12) United States Patent
Poursohi et al.

(10) Patent No.: US 8,854,362 B1
(45) Date of Patent: Oct. 7, 2014

(54) SYSTEMS AND METHODS FOR COLLECTING DATA

(75) Inventors: Arshan Poursohi, Berkeley, CA (US); Ryan Hickman, Mountain View, CA (US); Chaitanya Gharpure, Sunnyvale, CA (US); Thor Lewis, San Francisco, CA (US)

(73) Assignee: Google Inc., Mountain View, CA (US)

( * ) Notice: Subject to any disclaimer, the term of this patent is extended or adjusted under 35 U.S.C. 154(b) by 50 days.

(21) Appl. No.: 13/592,450

(22) Filed: Aug. 23, 2012

Related U.S. Application Data

(60) Provisional application No. 61/674,566, filed on Jul. 23, 2012.

(51) Int. Cl.
G06T 17/00 (2006.01)

(52) U.S. Cl.
USPC .......................................... 345/420; 345/581

(58) Field of Classification Search
USPC ........................................................ 345/419
See application file for complete search history.

(56) References Cited

U.S. PATENT DOCUMENTS

| | | | | |
|---|---|---|---|---|
| 6,075,605 A * | 6/2000 | Futamura et al. | ............. | 356/608 |
| 6,219,057 B1 * | 4/2001 | Carey et al. | .................... | 345/419 |
| 6,341,016 B1 * | 1/2002 | Malione | ........................ | 356/603 |
| 6,542,249 B1 * | 4/2003 | Kofman et al. | ................ | 356/601 |
| 6,823,080 B2 * | 11/2004 | Iijima et al. | .................... | 382/154 |
| 6,930,681 B2 * | 8/2005 | Raskar et al. | .................. | 345/419 |
| 7,034,820 B2 * | 4/2006 | Urisaka et al. | ................ | 345/419 |
| 7,068,274 B2 * | 6/2006 | Welch et al. | .................... | 345/426 |
| 7,289,662 B2 * | 10/2007 | Keaton et al. | .................. | 382/154 |
| 7,487,070 B2 * | 2/2009 | Shay et al. | ......................... | 703/1 |
| 7,737,965 B2 * | 6/2010 | Alter et al. | ..................... | 345/419 |
| 8,284,240 B2 * | 10/2012 | Saint-Pierre et al. | ........... | 348/47 |
| 8,411,086 B2 * | 4/2013 | Rieffel et al. | .................. | 345/420 |
| 2002/0035416 A1 * | 3/2002 | De Leon | .......................... | 701/14 |
| 2002/0190982 A1 * | 12/2002 | Kotcheff et al. | ............... | 345/420 |
| 2005/0131607 A1 * | 6/2005 | Breed | .............................. | 701/45 |
| 2006/0241445 A1 * | 10/2006 | Altmann et al. | ............... | 600/443 |
| 2007/0020588 A1 * | 1/2007 | Batcheller et al. | .............. | 434/30 |
| 2008/0033661 A1 * | 2/2008 | Syroid et al. | ..................... | 702/22 |
| 2008/0158239 A1 * | 7/2008 | Lamy et al. | ..................... | 345/581 |
| 2008/0158256 A1 * | 7/2008 | Russell et al. | ................. | 345/629 |
| 2009/0076749 A1 * | 3/2009 | Nasle | ................................ | 702/62 |
| 2009/0306638 A1 * | 12/2009 | Hillely et al. | .................... | 606/21 |
| 2009/0313014 A1 * | 12/2009 | Shin | ............................... | 704/235 |
| 2010/0259683 A1 * | 10/2010 | Setlur | ............................ | 348/581 |
| 2012/0011142 A1 * | 1/2012 | Baheti et al. | ................... | 707/769 |
| 2012/0176478 A1 | 7/2012 | Wang et al. | | |
| 2012/0177283 A1 | 7/2012 | Wang et al. | | |
| 2013/0021447 A1 * | 1/2013 | Brisedoux et al. | .............. | 348/47 |

\* cited by examiner

*Primary Examiner* — Phi Hoang

(74) *Attorney, Agent, or Firm* — McDonnell Boehnen Hulbert & Berghoff LLP

(57) ABSTRACT

Systems and methods for collecting data from an object are provided. In examples, a plurality of sensing components are configured to receive information indicative of one or more characteristics of the object. The information indicative of one or more characteristics of the object can be associated with respective data points of the object. The system is further configured to generate a three-dimensional (3D) view of the object based on the information indicative of one or more characteristics of the object and the association with respective data points.

24 Claims, 6 Drawing Sheets

SYSTEMS AND METHODS FOR COLLECTING DATA

CROSS-REFERENCE TO RELATED APPLICATIONS

This application claims the benefit of U.S. Provisional Application No. 61/674,566 filed on Jul. 23, 2012, the entirety of which is herein incorporated by reference.

BACKGROUND

In computer graphics, three-dimensional modeling (3D) involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g., the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

The present disclosure relates to a system including a plurality of sensing components configured to determine information indicative of one or more characteristics of an object. The system also includes one or more computing devices, and a memory that is configured to store instructions that when executed by the one or more computing devices cause the one or more computing devices to perform functions including associating the information indicative of one or more characteristics of an object with respective data points on the object to which the one or more characteristics correspond. The association is based on parameters defining rendering features for the respective data points of the object. The functions further include generating a three-dimensional (3D) view of the object based on the information indicative of one or more characteristics of an object and the association with respective data points.

In another aspect, a method is provided. The method includes determining information indicative of one or more characteristics of an object, and associating the information indicative of the one or more characteristics of the object with respective data points on the object to which the one or more characteristics correspond. The association is based on parameters defining rendering features for the respective data points of the object. The method further includes generating a three-dimensional (3D) view of the object based on the information indicative of one or more characteristics of the object and the association with respective data points.

In another aspect, a system is provided including a plurality of sensing components configured to receive information indicative of one or more characteristics of an object. The system includes a first sensing component configured to receive input regarding a first property of the object, and producing a first output, a second sensing component configured to receive input regarding a second property of the object, and producing a second output, and a third sensing component configured to receive input regarding a third property of the object, and producing a third output. The system also includes one or more computing devices, and a memory configured to store instructions that when executed by the one or more computing devices cause the one or more computing devices to associate the information indicative of one or more characteristics of the object with respective data points on the object to which the one or more characteristics correspond. The association is based on parameters defining rendering features for the respective data points of the object. The functions further include determining, based on the first output, whether the second sensing component receives input regarding the second property and determining, based on the first output, whether the third sensing component receives input regarding the third property. The functions also include generating a three-dimensional (3D) view of the object based on the information indicative of one or more characteristics of an object and the association with respective data points.

In still another aspect, a computer-readable medium having stored therein instructions that, when executed by a computing device, cause the computing device to perform functions is provided. The functions include determining information indicative of one or more characteristics of an object, and associating the information indicative of the one or more characteristics of the object with respective data points on the object to which the one or more characteristics correspond. The association is based on parameters defining rendering features for the respective data points of the object. The functions further include generating a three-dimensional (3D) view of the object based on the information indicative of one or more characteristics of the object and the association with respective data points.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, systems and methods for collecting data of an object. An example system may include a plurality of components configured to receive information indicative of one or more characteristics of the object. The information indicative of one or more characteristics of the object can be associated with respective data points of the object. The system is further configured to generate a three-dimensional (3D) view of the object based on the information indicative of one or more characteristics of the object and the association with respective data points.

Figure 1:
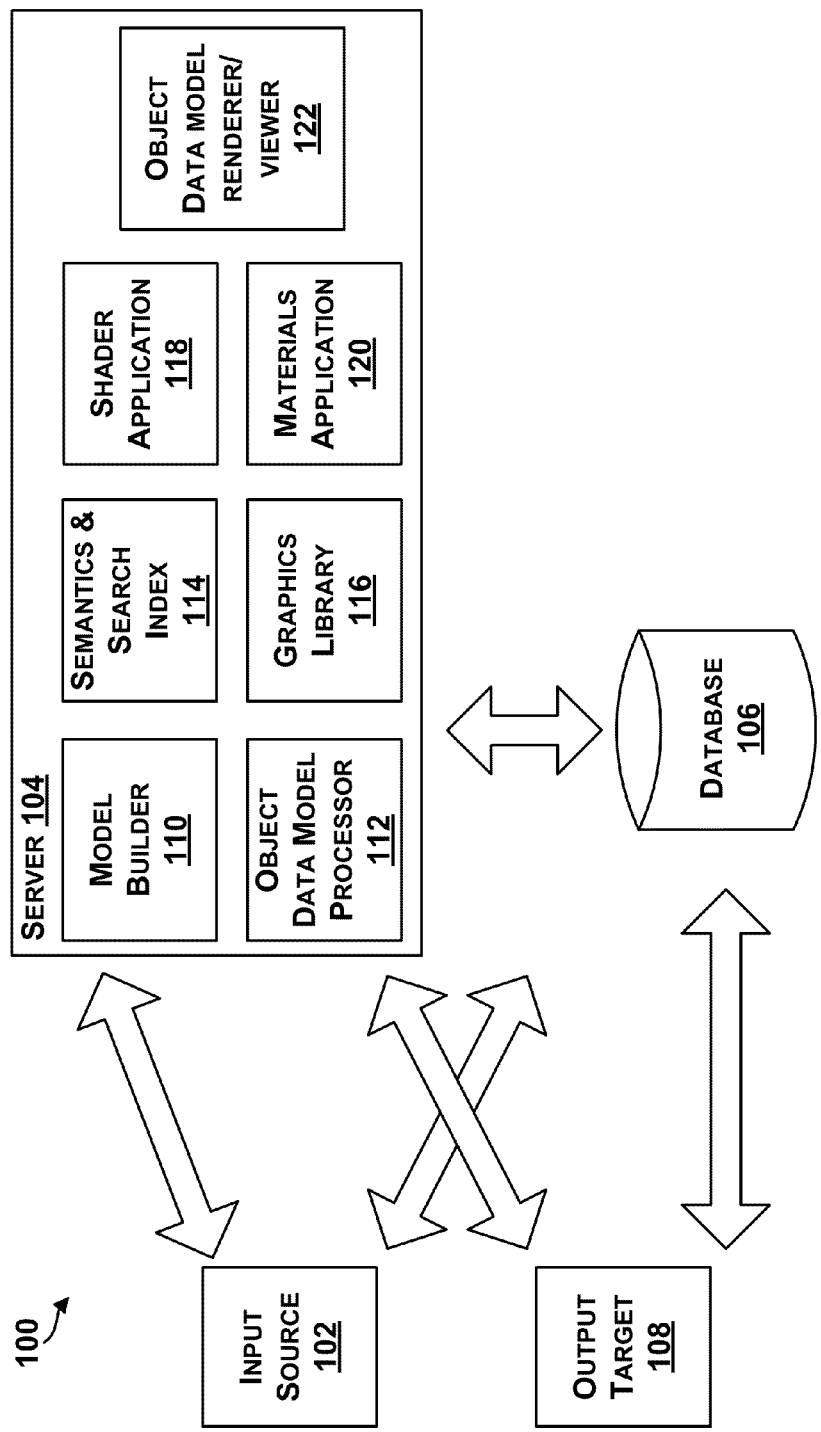
FIG. 1 illustrates an example system for object data modeling, in accordance with an embodiment.

Referring now to the figures, FIG. 1 illustrates an example system 100 for object data modeling, in accordance with an embodiment. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In another example, the systems described with respect to FIG. 2 may be used to capture images of objects. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets H that have colors but no UV (coordinate system of a 2D texture space) unwrapping to generate a mesh D with UV unwrapping but no colors. As an example, for a single output texture pixel of an image processing may include, for a given point in UV determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

In some examples, the model builder 110 or the object data model processor 112 may output a 3D object data model of an object that includes one file with a combination of all data needed to render a 3D image of the object. In other examples, the model builder 110 or the object data model processor 112 may output a 3D object data model in the form of multiple files so that the 3D object data model file is divided into smaller parts.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or the files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL or other mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or to files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions so that the materials application 120 can be executed to render the separate distinct portions. As an example, a hood on a car may include a hood ornament, and the hood may be painted and the ornament may be chrome. The materials application 120 and the shader application 118 can be executed to identify two separate materials and render each material with an appropriate shade.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
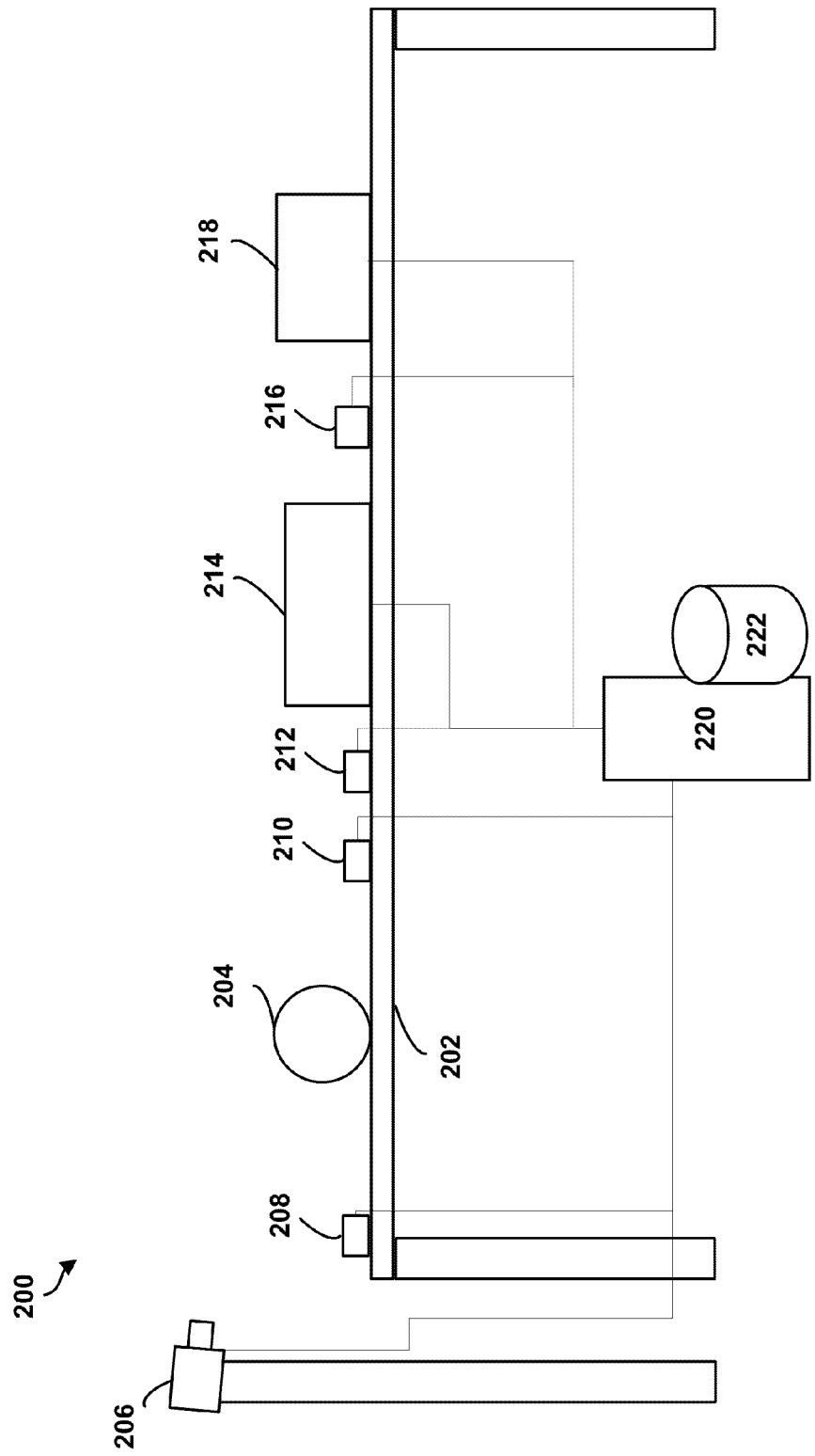
FIG. 2 illustrates an example system for collecting data from an object.

FIG. 2 illustrates an example system 200 for determining one or more properties of an object. The system 200 may include a plurality of sensing components 206-218, which may be located on an assembly line 202, for example. In some embodiments, the assembly line 202 may include a conveyor belt or other similar mechanism to move an object 204. Further, in some embodiments, the assembly line 202 may include an additional mechanism, such as a robotic arm, for example, to move the object. In other embodiments, the plurality of sensing components 206-218 may be arranged in any suitable manner or order.

The plurality of sensing components 206-218 may be configured to receive data or information indicative of one or more characteristics of the object 204, such as size, color, shape, thickness, and weight, for example. In some embodiments, the one or more characteristics of the object 204 may comprise information based on multiple senses, such as sight data, smell data, touch data, or sound data, or a combination, for example. It should be understood that the system 200 may include additional or less sensing components 206-218. Further, many of the sensing components 206-218 may be combined, or functionalities of the sensing components 206-218 can be combined into one component. The object 204 may be any type of object (e.g., a shoe, purse, computer, statue, or a toy) and may be of any size.

The sensing components 206-218 may include, for example, one or more image capture devices, which can be configured to capture a plurality of images of the object 204. The image capture device may include one or a combination of 3D scanning devices, cameras, or other types of devices capable of determining 2D or 3D information associated with the object 204 (or surfaces of the object 204). In some embodiments, the image capture device may include one or more optical sensors. The image capture device may be stationary or mobile.

The sensing components 206-218 may also include other similar devices configured to collect data from the object 204. The collected data may help to accurately determine a variety of properties of the object 204, such as material properties, size, shape, etc. The data collected may be used to generate a three-dimensional (3D) view of the object. For instance, the collected data may be provided to a data controller 220 and database 222 configured to collect the data and generate the 3D view. The data controller 220 may include one or any combination of processors. Additionally, the database 222 may include any type of memory or storage medium.

In one example, the sensing components 206-218 may include one or more weight sensors configured to receive input regarding a weight of the object 204. Measuring the weight of the object 204 may help to accurately determine other properties of the object, such as material properties or size. Alternatively or additionally, a tumbler such as a paint tumbler may be configured to spin and/or shake the object 204 to determine the weight (not shown). The weight may be used along with the plurality of images and other collected data to generate an accurate 3D view of the object 204.

The sensing components 206-218 may further include one or more temperature sensors configured to receive input regarding a temperature of the object 204. Obtaining an accurate temperature of the object 204 may assist in determining additional properties of the object. In one example, a heat capacity of the object may be measured to determine how long the object can withstand a certain temperature, which in turn may be used to determine a thickness of the object 204. In another embodiment, a heat radiation of the object 204 may be obtained by the temperature sensor.

A magnetic sensor may also be included as a component in the system 200. The magnetic sensor may be configured to receive input regarding a magnetic property of the object 204, such as an electro-magnetic field, for example. In one example, the magnetic sensor may be a Hall effect sensor.

The sensing components 206-218 may further include an audio or sound sensor or other receiving or recording device configured to receive input regarding an effect of a sound, tap, or vibration on the object 204. In one example, the audio sensor may measure or receive input regarding an ultrasonic wave projected onto the object and evaluate the response. In another example, the audio sensor may measure or receive input regarding an effect of a sound by using a solenoid on the object 204. For instance, the solenoid may tap the object 204 and the audio sensor can measure the rebound of the taps to determine the elasticity of the object. In yet another example, one or more microphones or sound projectors may be used to record the sounds of the object 204, such as the sound the object makes when falling or dropped against a surface. The microphones or sound projectors may be stationary or mobile.

In another embodiment, the sensing components 206-218 may include a container configured to provide a liquid bath to partially submerge the object 204. The container of liquid bath may provide input regarding a volume of the object 204, which may be used to generate an accurate 3D view of the object 204. In one example, a robotic arm may move the object 204 into the liquid bath. In some examples, any suitable medium may be used to on obtain a volume of the object.

The sensing components 206-218 may further include an odor sensor configured to receive input regarding an odor or gas around the object 204. In some examples, an array of odor sensors may be used. The odors or gases on or around an object may aid in determining the type of material from which the object 204 is made.

In some embodiments, the object 204 may be placed within a vacuum configured to contain the object 204. A pressure sensor may be used in conjunction with the vacuum and may receive input regarding a pressure within the vacuum. The amount of pressure that the object 204 is able to withstand may assist in determining additional properties of the object, which in turn may be used to generate an accurate 3D view of the object 204.

The sensing components 206-218 may further include a light sensor configured to receive input regarding a reflection of the object 204. Example light sensors may include infrared, x-ray, and ultraviolet light sensors. The reflection of light off of the object 204 may assist in determining properties of the object, such as the type of material from which the object 204 is made.

It should be understood that the components listed above are examples. Any other component which may be used to assist in identifying properties of an object may be included in or used with the system 200.

In some examples, the sensing components 206-218 may be arranged in a particular order. For instance, in one embodiment, the odor sensor may be located outside of a range of the image capture device. Therefore, the odor sensor would not be included in the image captured by the image capture device. In another example, the image capture device may be located at a particular position, such as first in the assembly line 202 among the plurality of components, so that an image of the object 204 is captured before other data is captured by other components. Obtaining an image of the object first may enable the system 200 to identify the object, and therefore may eliminate the need to obtain data regarding the object by one or more of the other components.

In some embodiments, the data collected from the plurality of sensing components 206-218 is associated with a location or data point of the object 204. For instance, data indicating the presence of a shiny material may be associated with a particular location on the object, such as a back side of the object. The association may be based on parameters defining rendering features for data points of the object 204. In examples, the parameters may include information indicative of a material or of a physical property of the object. In other examples, data of multiple types of sensors may be associated with each respective data point of the object 204.

The system 200 is configured to generate a three-dimensional (3D) view of the object based on the data obtained and collected from the plurality of sensing components 206-218. In one example, the data may be input into a computing device that can generate a 3D view of the object by the systems and methods described above with respect to FIG. 1.

In some embodiments, the system 200 may provide a display including an embedded viewer configured to render a three-dimensional (3D) object data model that represents one or more objects so as to present a view of the one or more objects. The display may include, for example, a webpage, phone application, desktop application, kiosk, or other interactive presentation. The embedded viewer is operable to receive input, such as input from an input device. The 3D object data model is characterized by parameters defining rendering features for data points of the 3D object data model. In examples, the parameters may include information indicative of a material or of a physical property of the 3D object data model. In embodiments, the input may include a request to zoom in on a given data point, a request to provide a second view of the one or more objects, a request to rotate a rendering of the 3D object data model, a selection of a given data point, and a mouse-over of a given data point. Example rendering features may include size, animation, camera angle, orientation, zoom level, color, texture, shading, overlays, etc.

Figure 3:
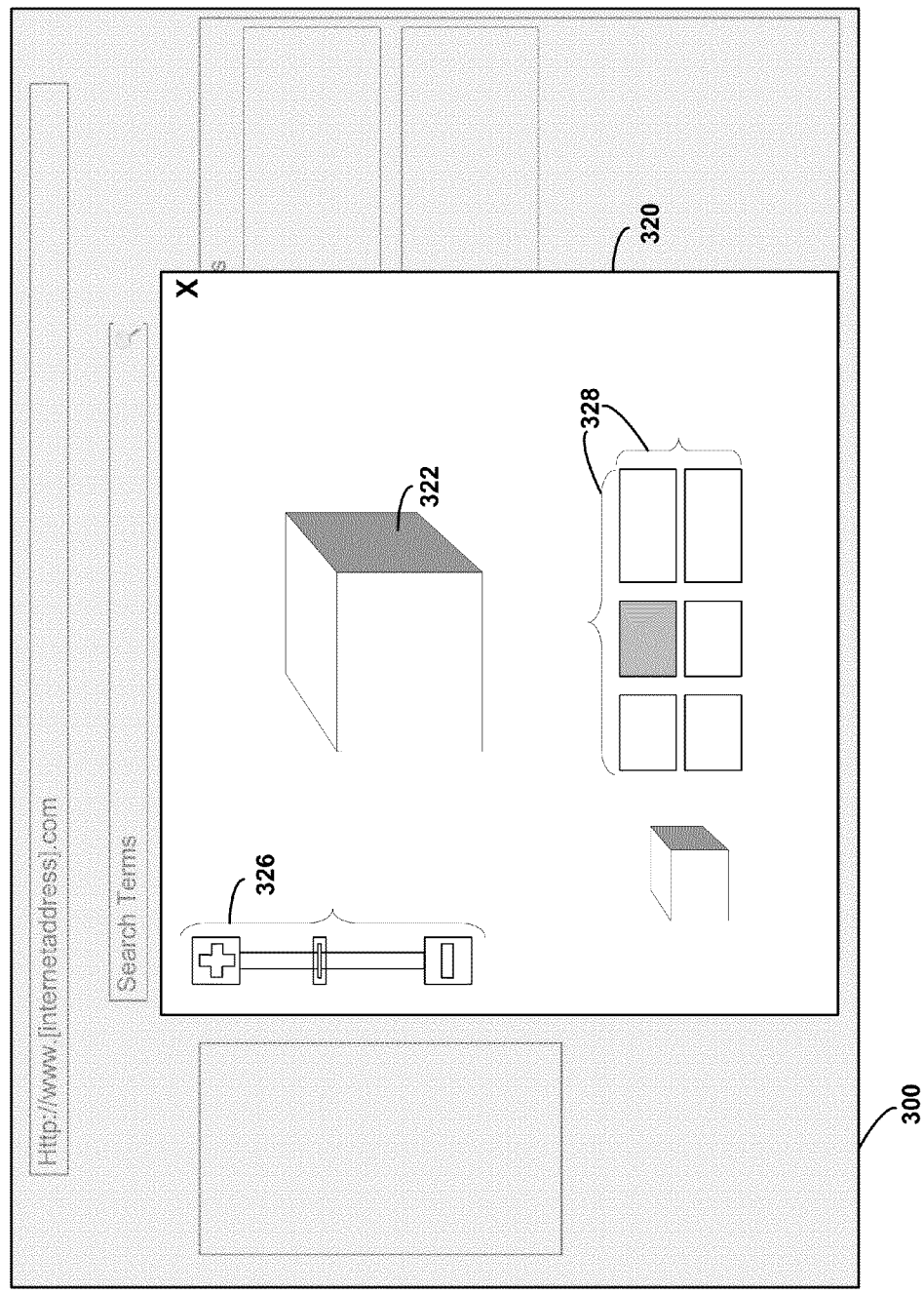
FIG. 3 illustrates an example 3D image viewer, in accordance with an embodiment.

FIG. 3 illustrates an example 3D image viewer 320, in accordance with an embodiment. In FIG. 3, the 3D image viewer 320 is initiated in a separate window that pops-up from a webpage 300, for illustration only. In other examples, the 3D image viewer 320 may be embedded within the webpage 300 and not in a separate window. For example, the webpage 300 may include an article about equipment X. A user may click on an icon on an inactive 3D image viewer (e.g., the 3D image viewer 320) embedded in the article to activate 3D image viewer.

In an example, the computing device may be configured to receive a 3D object data model file from a server. The 3D object data model file may include data to render the 3D image 322 of the object, or the 3D object data model file may be one of many files for the object (e.g., an object may be a mobile phone that has ten parts, and each part of the phone may be represented by a distinct file). The 3D object data model file may be an indexed file such that portions of image (s) represented by the file are labeled with a pointer to a shader or material that can be used to render an attribute of the object. As an example, for a mobile phone object, the mobile phone may have a rubber backing, a lens, a metal frame, etc., and each portion of the object may be represented by the file and indexed to an appropriate shader or material application.

In an example, the 3D image viewer 320 may be configured to provide a zooming tool 326 such that a user may be able to zoom in or out to focus on features or components of the object displayed in in the 3D image viewer 320. The 3D image viewer 320 also may be configured to provide a view change tool 328 that the user may be able to use to view different views (e.g., side views, top view, bottom view, etc.) of the object depicted in the 3D image 322. Other tools, capabilities, and functionalities may be possible.

In some examples, the location of the 3D image viewer may be defined within the embedded language by reserving a space in a web browser's document object model (DOM). The embedded language may also include instructions for controlling interactions with the 3D image. For example, JavaScript may define events based on user interface events such as a click, double-click, mouse up, mouse down, etc. over and/or near the 3D image. In one instance, clicking and dragging may enable a user to rotate the 3D image. It is also contemplated that the 3D image may be provided on other interfaces (e.g., touchscreen interfaces) and may be controlled with respective to input methods of the respective interfaces. Responses to any number of functionalities of the embedded 3D image viewer may also be defined within the embedded language.

In some examples, information indicative of one or more characteristics of the object, or information based on multiple types of senses, may be associated with each respective data point on the 3D object data model. For instance, when input is received at a given data point, such as a mouse-over of selection of the data point, the characteristic and sensor information regarding that data point is made available to the input device. In another example, the rendering of the 3D object data model may be tailored specifically for each data point based on the information associated with each data point. Thus, the embedded viewer may present different views of the 3D object data model based on the totality of information associated with each data point.

Different configurations including different components or more or less components than the system 200 are also possible. In another example, additional image capture devices may be included. In still another example, the system may include a positioning component (not shown) capable of changing an orientation of the object 204. For instance, the positioning component may include a robotic arm that is configured to lift, rotate, and lower the object to adjust an orientation of the object 204.

In some embodiments, every component 206-218 may not receive data from the object 204. For instance, a first component can be configured to receive input regarding a first property of the object and produce a first output. A second component can be configured to receive input regarding a second property of the object and produce a second output. Similarly, a third component can be configured to receive input regarding a third property of the object and produce a third output. Based on the first output, a determination may be made regarding whether the second component receives input regarding the second property. In other words, if sufficient data is garnered regarding a specific property of the object from the first component, there may not be a need for the second component to collect data regarding that same or similar property from the object as well. Further, based on either or both of the first and second outputs, a determination can be made regarding whether the third component receives input regarding the third property. Thus, a time required for data collection of the object can be reduced, resulting in faster and more efficient data collection and generation of the 3D view of the object.

In some embodiments, a confidence level of each component 206-218 may be measured and used to determine the accuracy of the data collected, and whether additional data collection is required. For example, each component may include a system or calculator to determine an accuracy of the output provided by the component. Based on the confidence level, the component may change or adjust one or more acquisition parameters associated with the component.

In yet another embodiment, the data collected from the components may be compared to a database of previously received and collected data. The database may include data collected from similar objects having similar properties, such as objects having similar shapes or comprising similar materials. Once compared to the previously collected data, the system may make a determination as to whether the data collected by the components is reasonable and/or accurate, or whether a new measurement or additional data should be taken or collected for the object or a part of the object. In some cases, if an object (or an individual part of an object) can be identified, the system may make a determination that no further data is needed for the object (or individual part). In one embodiment, the object is a shoe. The database includes a model template of data to be collected for a shoe. Upon the system determining the object under observance is a shoe, such as by scanning a bar code or through image analysis, for example, the system can determine parameters or characteristics of the object that may need to be determined. The system can then determine which components of the system need to be used (e.g., based on the data capture capabilities of the components), and may also determine an order of operation of the components.

Figure 4:
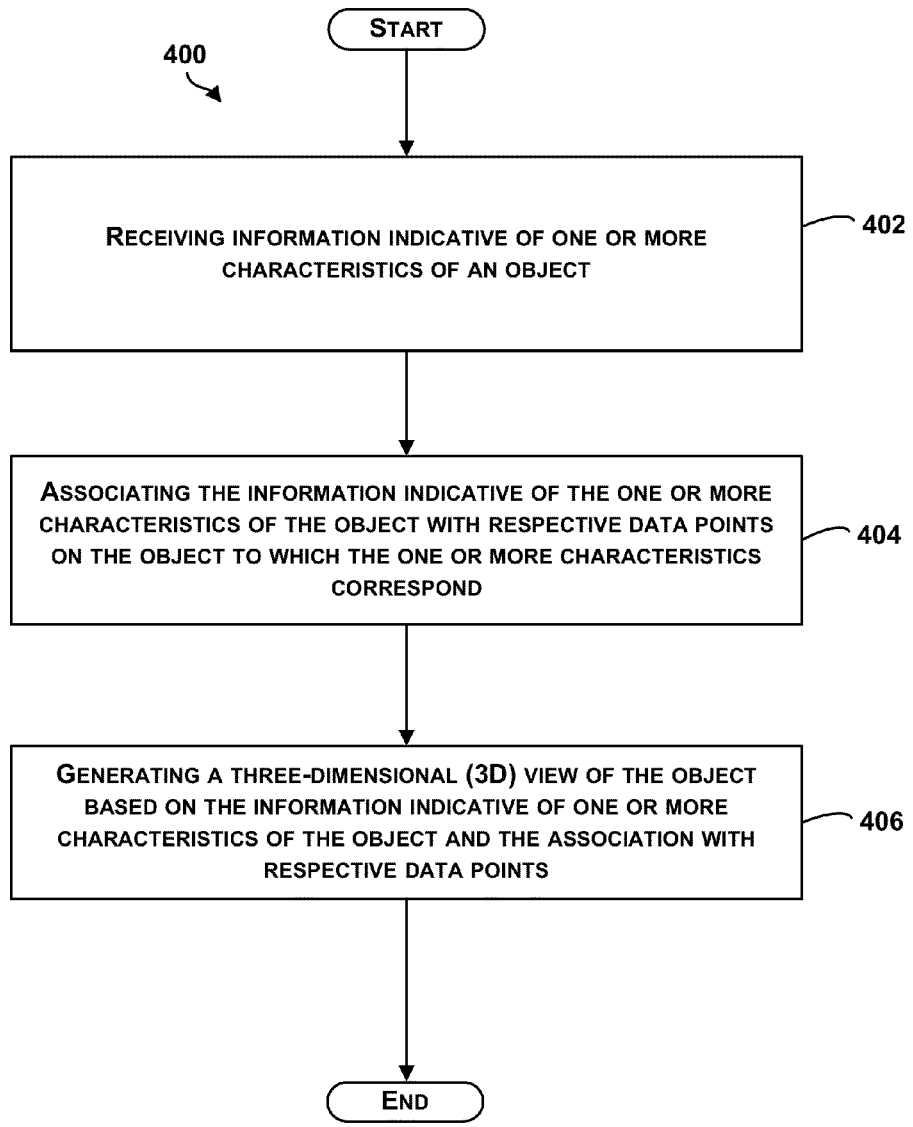
FIG. 4 is a block diagram of an example method for collecting data from an object, in accordance with an embodiment.

FIG. 4 illustrates a block diagram of an example method 400 of rendering a 3D object data model, in accordance with an embodiment. The method 400 shown in FIG. 4 presents an embodiment of a method that could be used by the systems 100 and 200 of FIGS. 1-2, for example.

The method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

Initially, at block 402, the method 400 includes receiving information indicative of one or more characteristics of an object, such as object 204. As mentioned above, the received information may include, for example, input regarding the color and texture of the object, a weight of the object, magnetic properties of the object, auditory signals of the object, a volume of the object, an odor or gas of an object, an amount of pressure exerted on the object, a temperature of the object, and a reflection of light on the object. Additional or less data or properties of the object may also be collected.

At block 404, the method 400 includes associating the information indicative of the one or more characteristics of the object with respective data points on the object to which the one or more characteristics correspond, wherein the association is based on parameters defining rendering features for the respective data points of the object. As discussed above, for example, data indicating the presence of a shiny material may be associated with a particular location on the object, such as a back side of the object. The particular location may be determined, for example, by multiple lighting and lens scenarios to take images from multiple angles, and then determine the reflections based on known angles between the object, lights, and cameras. The association may be based on parameters defining rendering features for data points of the object 204. In examples, the parameters may include information indicative of a material or of a physical property of the object.

At block 406, the method 400 includes generating a three-dimensional (3D) view of the object based on the information indicative of one or more characteristics of the object and the association with respective data points. For example, the plurality of images and views may be input into a computing device that can generate a 3D view of the object by the systems and methods described above with respect to FIG. 1.

Figure 5:
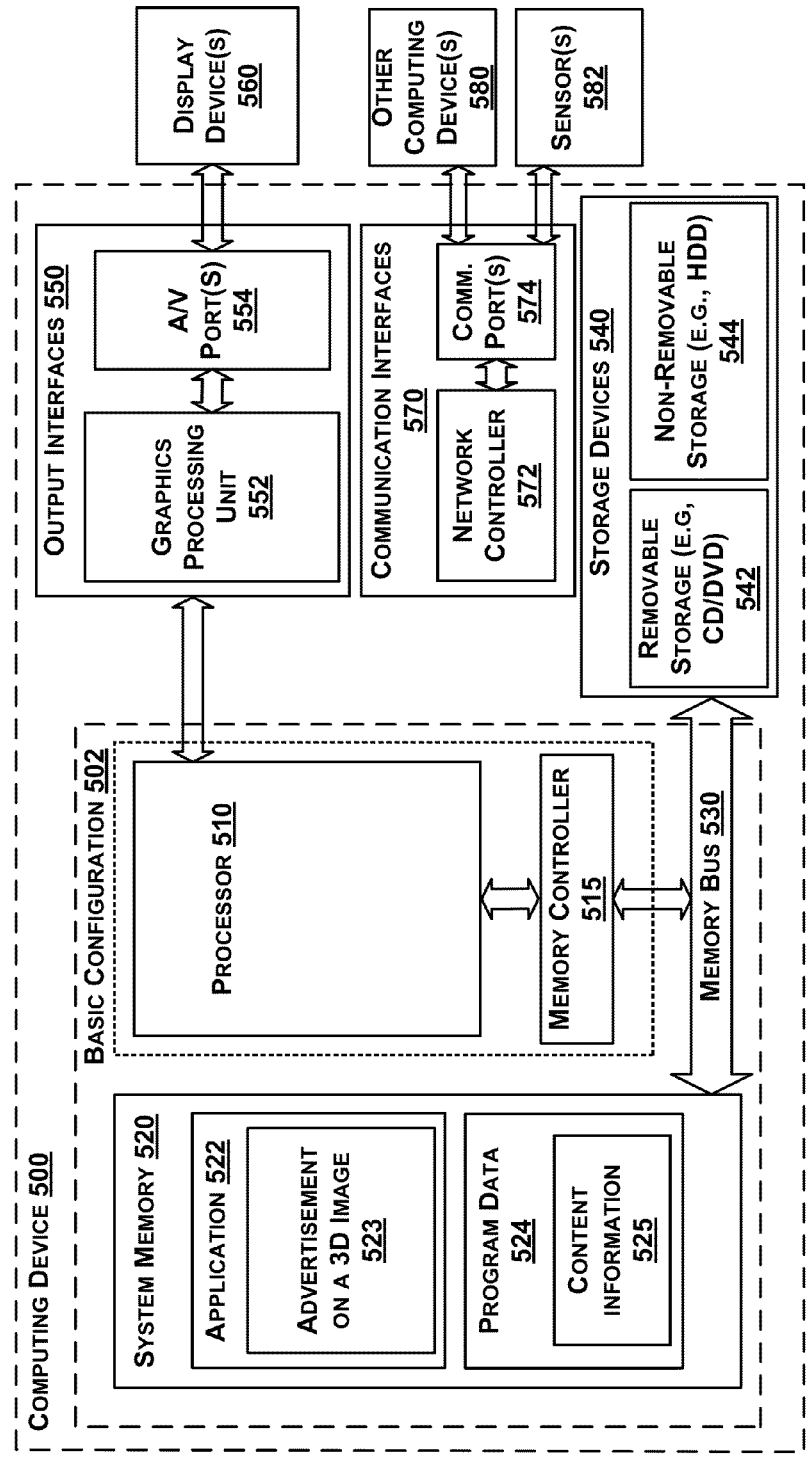
FIG. 5 is a functional block diagram illustrating an example computing device used in a computing system that is arranged in accordance with at least some embodiments described herein.

FIG. 5 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for image marking and three-dimensional (3D) image generation system as described in FIGS. 1-4. The computing device 500 may, for example, be used to implement the method 400 illustrated in FIG. 4.

In a basic configuration 502, computing device 500 may typically include one or more processors 510 and system memory 520. A memory bus 530 can be used for communicating between the processor 510 and the system memory 520. Depending on the desired configuration, processor 510 can be of any type including but not limited to a microprocessor (µP), a microcontroller (µW), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 may include one or more applications 522, and program data 524. Application 522 may include advertisement on a 3D image algorithm 523 that is arranged to provide inputs to the electronic circuits, in accordance with the present disclosure. Program data 524 may include content information 525 that could be directed to any number of types of data. In some example embodiments, application 522 can be arranged to operate with program data 524 on an operating system.

Computing device 500 can have additional features or functionality, and additional interfaces to facilitate communications between the basic configuration 502 and any devices and interfaces. For example, data storage devices 540 can be provided including removable storage devices 542, non-removable storage devices 544, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 520 and storage devices 540 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 500. Any such computer storage media can be part of the computing device 500.

The computing device 500 can also include output interfaces 550 that may include a graphics processing unit 552, which can be configured to communicate to various external devices such as display devices 560 or speakers via one or more A/V ports 554 or a communication interface 570. The communication interface 570 may include a network controller 572, which can be arranged to facilitate communications with one or more other computing devices 580 and one or more sensors 582 over a network communication via one or more communication ports 574. The one or more sensors 582 are shown external to the computing device 500, but may also be internal to the device. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Figure 6:
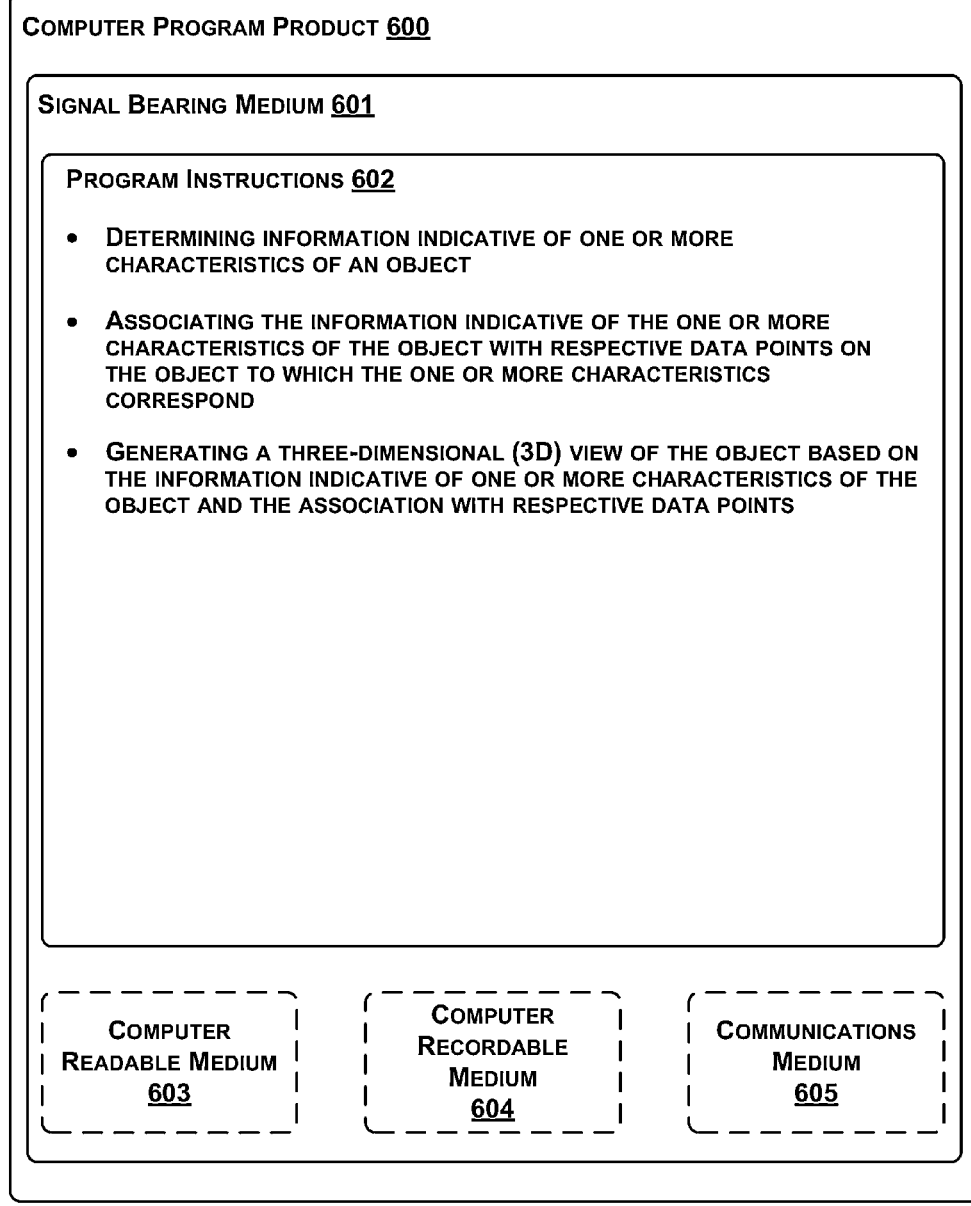
FIG. 6 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1-5. In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 500 by one or more of the computer readable medium 603, the computer recordable medium 604, and/or the communications medium 605.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed, other aspects and embodiments will be apparent to those skilled in the art. The various aspects and embodiments provided in this disclosure are for purposes of illustration and are not intended to be limiting, with the true scope being indicated by the following claims, along with the full scope of equivalents to which the claims are entitled.

The invention claimed is:

1. A system comprising:
a plurality of sensing components configured to determine information indicative of one or more characteristics of a first object, wherein each sensing component is configured to determine a confidence level associated with the information indicative of one or more characteristics of the first object provided by that sensing component;
one or more computing devices; and
a memory, the memory configured to store instructions, that when executed by the one or more computing devices, cause the one or more computing devices to perform functions comprising:
comparing information about the first object acquired by a first sensing component of the plurality of sensing components to a database of information indicative of characteristics of other objects that are separate from the first object;
determining, based on the comparison, whether to acquire additional information indicative of characteristics of the first object using one or more other sensing components of the plurality of sensing components;
associating the information indicative of one or more characteristics of the first object with respective data points on the first object to which the one or more characteristics correspond, wherein the information indicative of one or more characteristics of the first object is associated with parameters defining rendering features for the respective data points of the first object; and
generating a three-dimensional (3D) view of the object based on the information indicative of one or more characteristics of the object and the association with respective data points.

2. The system of claim 1, wherein the plurality of sensing components includes an image capture device.

3. The system of claim 2, wherein the plurality of sensing components includes at least one sensing component selected from the group consisting of: an odor sensor, weight sensor, temperature sensor, and audio sensor.

4. The system of claim 2, wherein the image capture device is configured to operate first among the plurality of sensing components.

5. The system of claim 1, configured such that the functions are operative to provide a display including an embedded viewer configured to render a three-dimensional (3D) object data model that represents the first object so as to present a view of the first object, wherein the 3D object data model is characterized by the parameters defining rendering features for the respective data points of the first object.

6. The system of claim 5, configured such that the functions are operative to cause the one or more computing devices to associate the information indicative of one or more characteristics of the first object with respective data points on the 3D object data model.

7. The system of claim 6, wherein the embedded viewer is operable to receive input, wherein the input comprises one or more of a request to zoom in on a given data point, a request to provide a second view of the first object, a request to rotate a rendering of the 3D object data model, a selection of a given data point, and a mouse-over of a given data point.

8. The system of claim 5, wherein the rendering of the 3D object data model is tailored for each data point based on the information associated with each data point.

9. The system of claim 1, wherein information indicative of one or more characteristics of the first object comprises information based on multiple senses.

10. The method of claim 1, wherein the functions further comprise:
identifying the first object based on the comparison; and
in response to identifying the first object, determining an order of operation of the plurality of sensing components.

11. A method comprising:
determining information indicative of one or more characteristics of a first object using one or more sensing components;
comparing the information to a database of information indicative of characteristics of other objects that are separate from the first object;
based on the comparison, determining whether to acquire further information indicative of one or more characteristics of the first object using the one or more sensing components;
associating the information indicative of the one or more characteristics of the first object with respective data points on the first object to which the one or more characteristics correspond, wherein the information indicative of one or more characteristics of the first object is associated with parameters defining rendering features for the respective data points of the first object; and generating a three-dimensional (3D) view of the first object based on the information indicative of one or more characteristics of the first object and the association with respective data points.

12. The method of claim 11, further comprising:
determining a confidence level associated with the determined information, and
wherein the determination regarding whether to acquire further information indicative of one or more characteristics of the first object is further based on the confidence level.

13. The method of claim 11, further comprising providing a display including an embedded viewer configured to render a three-dimensional (3D) object data model that represents the first object so as to present a view of the first object, wherein the 3D object data model is characterized by the parameters defining rendering features for the respective data points of the first object.

14. The method of claim 11, further comprising receiving, from the embedded viewer, information indicating an input to the embedded viewer, wherein the input is based on a given data point of the view of the first object presented by the embedded viewer.

15. The method of claim 14, wherein the input comprises one or more of a request to zoom in on the given data point, a request to provide a second view of the first object, a request to rotate a rendering of the 3D object data model, a selection of the given data point, and a mouse-over of the given data point.

16. A system comprising:
a plurality of sensing components configured to determine information indicative of one or more characteristics of an object, comprising:
a first sensing component configured to determine data regarding a first property of the object and produce a first output based on the determined data regarding the first property, wherein the first sensing component comprises an image capture device and the data regarding the first property of the object comprises an image of the object;
a second sensing component configured to determine data regarding a second property of the object and produce a second output based on the determined data regarding the second property; and
a third sensing component configured to determine data regarding a third property of the object and produce a third output based on the determined data regarding the third property;
one or more computing devices; and
a memory configured to store instructions that when executed by the one or more computing devices, cause the one or more computing devices to perform functions comprising:
associating the information indicative of one or more characteristics of the object with respective data points on the object to which the one or more characteristics correspond, wherein the information indicative of one or more characteristics of the object is associated with parameters defining rendering features for the respective data points of the object;
determining, based on the first output, whether the second sensing component determines data regarding the second property;
determining, based on the first output, whether the third sensing component determines data regarding the third property; and
generating a three-dimensional (3D) view of the object based on the information indicative of one or more characteristics of the object and the association with respective data points.

17. The system of claim 16, wherein determining whether the second sensing component determines data regarding the second property comprises comparing the information indicative of one or more characteristics of the object to a database of information indicative of characteristics of other objects that are separate from the object, and determining whether to acquire additional information based on the comparison.

18. The system of claim 16, wherein the plurality of sensing components are located on an assembly line, wherein the assembly line comprises a robotic arm configured to move the object.

19. The system of claim 16, wherein the functions further comprise providing a display including an embedded viewer configured to render a three-dimensional (3D) object data model that represents the object so as to present a view of the object, wherein the 3D object data model is characterized by the parameters defining rendering features for the respective data points of the object.

20. A non-transitory computer-readable medium having stored therein instructions that, when executed by a computing device, cause the computing device to perform functions comprising:
determining information indicative of one or more characteristics of a first object using one or more sensing components;
comparing the information to a database of information indicative of characteristics of other objects that are separate from the first object;
based on the comparison, determining whether to acquire further information indicative of one or more characteristics of the first object using the one or more sensing components;
associating the information indicative of the one or more characteristics of the first object with respective data points on the first object to which the one or more characteristics correspond, wherein the information indicative of one or more characteristics of the first object is associated with parameters defining rendering features for the respective data points of the first object; and
generating a three-dimensional (3D) view of the first object based on the information indicative of one or more characteristics of the first object and the association with respective data points.

21. The non-transitory computer-readable medium of claim 20, wherein the functions further comprise:
determining a confidence level associated with the determined information, and
wherein the determination regarding whether to acquire further information indicative of one or more characteristics of the first object is further based on the confidence level.

22. The non-transitory computer-readable medium of claim 20, wherein the functions further comprise providing a display including an embedded viewer configured to render a three-dimensional (3D) object data model that represents the first object so as to present a view of the first object, wherein the 3D object data model is characterized by the parameters defining rendering features for the respective data points of the first object.

23. The non-transitory computer-readable medium of claim 20, wherein the functions further comprise receiving, from the embedded viewer, information indicating an input to the embedded viewer, wherein the input is based on a given data point of the view of the first object presented by the embedded viewer.

24. The non-transitory computer-readable medium of claim 23, wherein the input comprises one or more of a request to zoom in on the given data point, a request to provide a second view of the first object, a request to rotate a rendering of the 3D object data model, a selection of the given data point, and a mouse-over of the given data point.

* * * * *